Dec. 24, 1957 — A. C. VINE — 2,817,148
SQUARE INTEGRATOR

Filed May 24, 1948 — 2 Sheets-Sheet 1

INVENTOR
ALLYN C. VINE

BY *M. O. Hayes*

ATTORNEY

Dec. 24, 1957  A. C. VINE  2,817,148
SQUARE INTEGRATOR

Filed May 24, 1948  2 Sheets-Sheet 2

INVENTOR
ALLYN C. VINE

BY *M. C. Hayes*

ATTORNEY

United States Patent Office 2,817,148
Patented Dec. 24, 1957

2,817,148

SQUARE INTEGRATOR

Allyn C. Vine, Woods Hole, Mass., assignor to the United States of America as represented by the Secretary of the Navy Application May 24, 1948, Serial No. 28,951

7 Claims. (Cl. 33—121)

This invention relates to mathematical devices and more particularly to an integrator for determining an area having a definite relation to the area under a predetermined curve.

If the equation of a curve is known, the area under the curve may be obtained by properly integrating the mathematical equation for the curve. If the equation of the curve is very complex, or if the equation is not known but the curve has been plotted, the area under the curve may be obtained by means of a planimeter. It frequently happens, however, that data for one curve is taken or such a curve is plotted automatically while a test is being run but that the information desired is not the area under this curve but the area under a curve mathematically related to this first curve.

For example, a recording pressure measuring device may plot a curve of pressure vs. time in rectangular coordinates while the information desired is the area under the (pressure)² vs. time curve.

Heretofore, it has been necessary either to determine the equation of the pressure vs. time curve and integrate mathematically the square of this equation to obtain the area or to re-plot the curve point by point to obtain a (pressure)² vs. time curve and then measure the area under this new curve by means of a planimeter or other similar device. Either of these methods is difficult, time consuming and subject to numerous errors.

It is an object of this invention, therefore, to provide a simple, novel means for measuring the area under an irregular curve.

It is a further object of this invention to provide a novel and useful means for computing from a given curve the area contained under a second curve having a predetermined mathematical relationship to the first curve.

Still another object of the present invention is to eliminate at least in part the difficulties encountered in measuring areas with a planimeter where the curves are drawn to different scales.

Other objects, features and advantages will appear from the following description which is to be read in connection with the accompanying drawings wherein.

Figure 1:
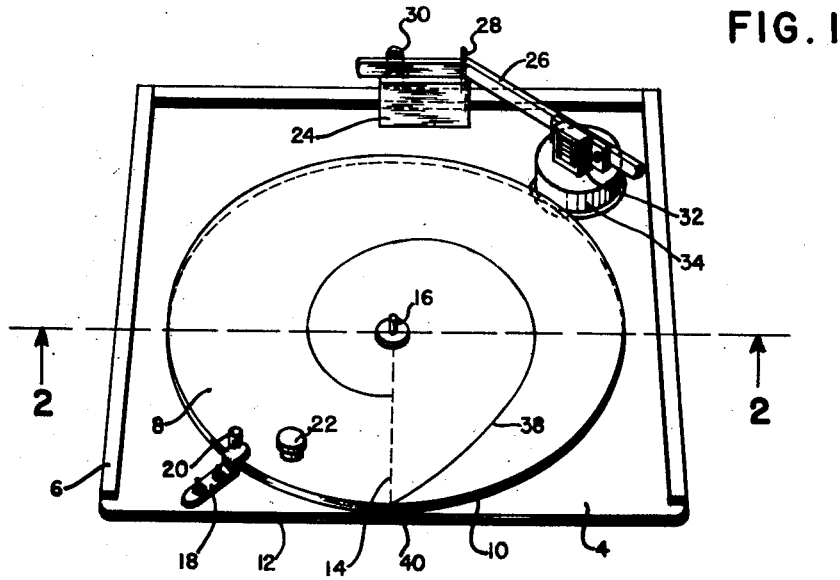
Fig. 1 is a perspective view of a preferred embodiment of the present invention.
Figure 2:
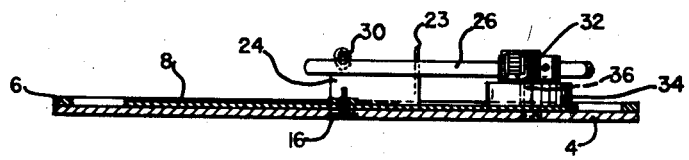
Fig. 2 is a sectional elevation of the embodiment shown in Fig. 1 taken along the line 2—2 of Fig. 1.

In Figs. 1 and 2 of the drawing, numeral 4 denotes a thin plate of transparent material such as glass, plastic, or the like. A frame 6 extends around three sides of plate 4 to stiffen plate 4. Frame 6 also aids in moving and positioning the device. If plate 4 is of glass or other rigid material, frame 6 may be omitted in some instances.

Rotatably mounted on plate 4 is a circular disc 8 also formed of thin transparent material. Disc 8 is positioned so that the outer peripheral edge 10 of this disc is tangent to the uncovered edge 12 of plate 4 as shown in Fig. 1. A reference line 14 is formed in or on plate 4 from the point of tangency to the pivotal point for disc 8. From the geometry of the device, it is apparent that line 14 is perpendicular to edge 12. As will appear presently, disc 8 may be tangent to a line marked on plate 4 rather than edge 12. In certain other embodiments, disc 8 need not be tangent to edge 12 and the line of reference may be tangent to a circle having a smaller radius than disc 8. It will also appear that line 14 need not extend through the center of disc 8 but it should be so located that it would pass through this center if extended.

A suitable pivot pin 16 is provided, extending through disc 8 and plate 4 and preferably terminating flush with the underneath side of plate 4. If necessary the underside of plate 4 may be counterbored slightly to receive a head on pin 16.

A stop element 18 is secured to plate 4 in such a position that the unattached end thereof extends above disc 8. A pin 20 is secured to disc 8 so that its path intersects stop 18 thus limiting the movement of disc 8 to slightly less than a complete revolution. Stop 18 and pin 20 cooperate to permit indexing disc 8 to a reference position. A knob 22 is provided on disc 8 to facilitate the rotation of disc 8 about pivot 16.

In the opposite corner of plate 4 from that occupied by stop 18 is mounted a block 24, carrying at one end a rigid arm 26 on a pivot 28. Arm 26 is in contact with an upright flat spring member 30. Arm 26 is formed with an angularly extending portion overhanging plate 4 and carries at its extremity a counter member 32. From the counter is suspended a cylinder 34 fixed to a rotatable shaft 36. The cylinder 34 is preferably received in an opening in plate 4 that is larger in diameter than cylinder 34 and which extends slightly beneath disc 8. Spring 30 normally holds cylinder 34 away from disc 8 but cylinder 34 may be moved into peripheral contact with disc 8 by slight pressure applied at the outer end of arm 26. When cylinder 34 is rotated by disc 8, shaft 36 rotates causing counter member 32 to register.

A line 38 is inscribed on disc 8 starting at point 40 at the peripheral edge 10 of disc 8 and extending inwardly in accordance with a desired mathematical relationship. The point 40 on the edge 10 of disc 8 at which curve 38 starts is the point directly above line 14 when disc 8 is rotated counterclockwise until pin 20 engages stop 18.

Figure 3:
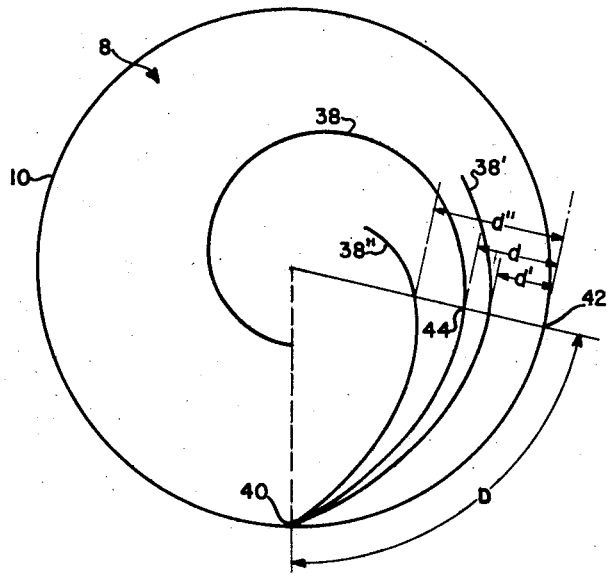
Fig. 3 is a plan view of one of the elements of Fig. 1 illustrating the manner in which this element is constructed.

Fig. 3 illustrates the manner in which the shape of curve 38 is determined. In Fig. 3 the distance D is the peripheral distance from point 40 to any arbitrarily selected point 42 on the edge 10 of disc 8. The distance $d$ is the radial distance from point 42 to a point 44 on line 38. Suppose, as was suggested above, that the curves available are curves of Y plotted against values of X while the information desired is the area under the curve represented by $(Y)^2$ plotted against values of X. In this case $d$ would equal $K(D)^{1/2}$ where K is any convenient constant. In Fig. 3, K has a value of 0.5.

In certain instances it may be desirable to find the area under the curve represented by functions other than the second power of Y. In the general case where it is desirable to find the area under the curve represented by $(Y)^n$ plotted against X, where $n$ may have any value greater than one, curve 38 may be plotted from the relationship $d=K(D)^{1/n}$. By way of further illustration, two additional curves 38' and 38" have been shown in Fig. 3 wherein $d'=.5(D)^{1/3}$ and $d''=.5(D)^{1/1.25}$. Once the shape of curve 38 has been determined, it is preferably permanently inscribed or marked on disc 8. For flexibility, curves for several different values of $n$ may be plotted on a single disc or, for simplicity, only one curve may be plotted on each disc. Pivot 16 may be so arranged that the discs 8 may be interchanged rapidly and easily.

Figure 4:
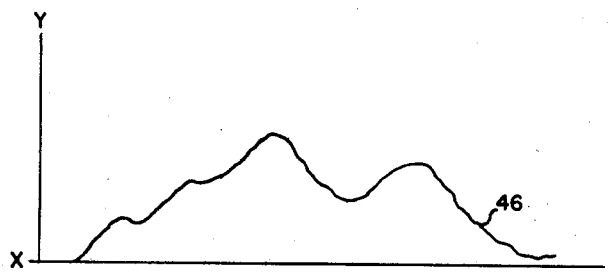
Fig. 4 is a plot of a curve of the type that might be measured using the present invention.
Figure 4A:
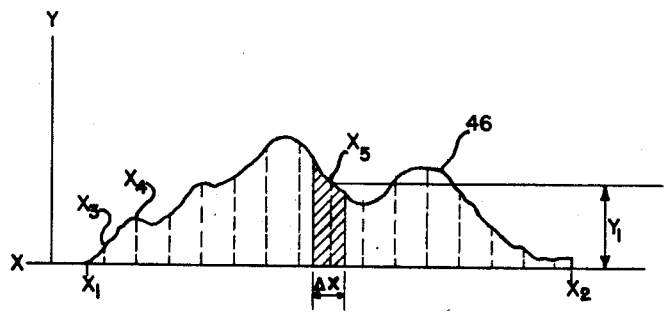
Fig. 4A is a view showing the curve of Fig. 4 subdivided to facilitate the use of the present invention.

Fig. 4 illustrates a curve 46 of Y plotted against values of X such as may have been obtained from a suitable recording device. Fig. 4A shows the same curve with the X-direction marked off in unit values of X.

Figure 5:
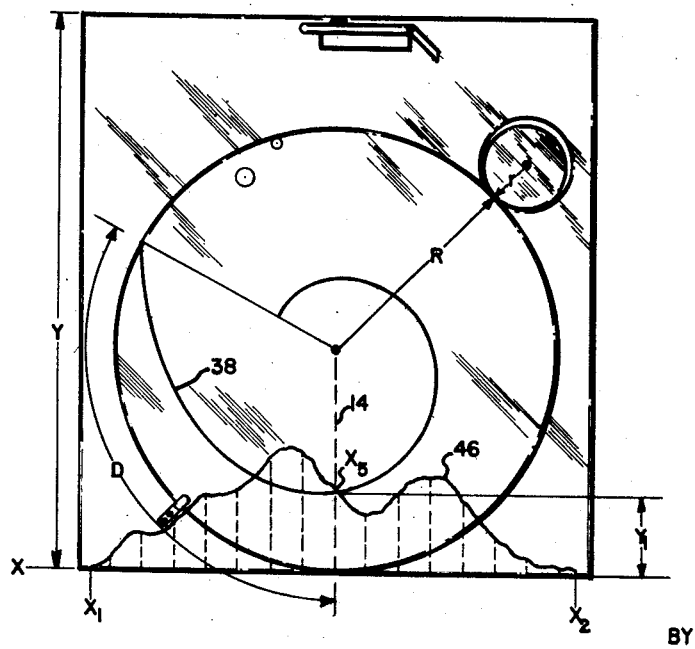
Fig. 5 is a view showing the manner in which the device of Fig. 1 is applied to the curve of Fig. 4 to measure this curve.

To compute the area under the curve of $Y^2$ plotted against X between points $X_1$ and $X_2$ given the curve of Fig. 4, the apparatus of Fig. 1 is placed over curve 46 so that edge 12 coincides with the X axis of the curve. The device is then shifted along the X axis until reference line 14 coincides with the first unit mark on the X axis. This unit mark is denoted as $X_3$ in Fig. 4A. A measurement is made at this mark and the device moved so that index mark 14 coincides with the next unit mark $X_4$ and so on until point $X_2$ is reached. The method of making one such measurement for unit mark $X_5$ is shown in Fig. 5. Edge 12 is placed along the X-axis with line 14 in coincidence with unit mark $X_5$. With cylinder 34 disengaged from disc 8, this disc is rotated until a point on curve 38 lies over the intersection of line 14 and curve 46. Only one point on curve 38 will satisfy this condition. Cylinder 34 is then moved into engagement with edge 10 of disc 8 and held in engagement while disc 8 is rotated counterclockwise until pin 20 strikes stop 18. At this point cylinder 34 is allowed to move out of engagement with disc 8 while the device is moved along to the next reference mark and the measurement process repeated. During the measurement just described the value indicated on counter member 32 is proportional to $(Y)^2 \cdot \Delta X$. If $\Delta X$ equals one, the radius of disc 8 equals R, and the radius of cylinder 34 equals $r$ the value indicated equals $$(Y)^2 \cdot \frac{R}{K^2 r}$$

Since K, R and $r$ are all known constants the scale of member 32 may be calibrated to read directly in values of $(Y)^2$. Since counter member 32 is not reset to zero after each measurement, when all the measurements have been completed between points $X_1$ and $X_2$, the final total on counter member 32 is the desired area expressed in square units. If the scale on which the values of Y are plotted is different from that to which X is plotted the value appearing on member 32 need only be multiplied by the proper constant to give the desired answer.

One obvious modification of the above device is to plot a curve for the value $n=1$. In this case the area computed would be the area under the curve of 46 of Fig. 4.

While there has been described what is at present considered the preferred embodiment of the invention it is obvious that various modifications may be made therein which fall fairly within the scope of the appended claims.

What is claimed is:

1. An integrating device comprising a plate having means thereon defining a reference line, means defining a reference point on said line, a circular disc rotatably mounted on said plate, means for indexing said disc to a reference position, said disc having marked thereon a curve extending inwardly from an initial point disposed above said reference point on said plate when said disc is in said reference position, said curve being so shaped that the radial distance from the peripheral edge of said disc to said curve from any point on said peripheral edge is a predetermined function of the angle between a radial line passing through said last mentioned point and a radial line passing through said initial point, and means movable into and out of engagement with said disc for measuring the angular rotation thereof.

2. An integrating device comprising a plate having one edge thereof substantially straight, a circular disc rotatably mounted on said plate and disposed tangent to said edge of said plate, means on said plate marking said point of tangency, stop means for indexing said disc to a reference position, a curve extending inwardly from an initial point on the periphery of said disc, said initial point being coincident with said point of tangency when said disc is in said reference position, the radial distance from any point on the periphery of said disc to said curve being a predetermined function of the peripheral distance from said last mentioned point to said initial point, and means movable into and out of engagement with the periphery of said disc for measuring and indicating the angular rotation of said disc.

3. A measuring device comprising a base plate having an index line running from a point taken centrally of the plate to one of its sides, a circular disc member superimposed on the plate and being rotatably secured at the said point of beginning of the index line, a projecting element located on the upper side of the disc, a stop member fixed to the plate and arranged to extend into the path of movement of said projecting element to limit rotation of the disc in one direction, said disc presenting a curve inscribed on its upper surface, said curve being so arranged that the radial distance from the edge of the disc to the curve, taken at any given point, is proportional to the square root of the circumferential distance measured from the point of intersection of the said curve with the peripheral edge of the disc to a point of intersection of a radial line passing through the said radial distance with the peripheral edge of the disc and countermechanism adapted to provide an indication of said circumferential distance operatively connected to the disc.

4. An integrating device for computing from a first curve the area contained under a second curve having a predetermined mathematical relationship to said first curve comprising a first plate having means thereon defining a reference line and a second line perpendicular to said reference line, a second plate parallel to and rotatably mounted on said first plate, the center of rotation of said second plate lying on said second line, a circular periphery on said second plate radially displaced about said center of rotation, the radius of said circular periphery being coextensive in magnitude with the distance along said second line from said center of rotation to the intersection of said second line and said reference line, a curve marked on said second plate extending from an initial reference point on said circular periphery inwardly of said periphery, the distance of said curve from said periphery being a selected mathematical function of the circumferential distance on said periphery from said initial reference point, and means for measuring the distance through which said initial reference point travels during selected angular rotations of said second plate.

5. An integrating device for computing the area under a curve represented by $(Y)^n$ plotted against X where $n$ is equal to or greater than 1 comprising a first plate having means thereon defining a reference line and a second line perpendicular to said reference line, a second plate rotatably mounted on said first plate, the axis of rotation of said second plate lying on said second line, a circular periphery on said second plate radially displaced about said axis of rotation, the radius of said circular periphery being coextensive in magnitude with the distance along said second line from said axis of rotation to the intersection of said second line and said reference line, a curve marked on said second plate extending from an initial reference point on said circular periphery inwardly of said periphery, said curve being plotted according to the relationship $d=KD^{1/n}$ where $d$ is the radical distance of any point on said curve from said periphery, D is the distance on said periphery between the initial point of said curve on said periphery and the point on said periphery lying on a radial line passing through said any point on said curve, $n$ is equal to or greater than 1 and corresponds to the exponent of Y in the mathematical relationship represented by the curve to be measured, and K is any convenient constant, and means for measuring the distance through which said initial point travels during selected angular rotations of said second plate.

6. An integrating device for computing the area under irregular curves comprising a first plate having means thereon defining a reference line and a perpendicular thereto defining thereat a reference point on said line, a second plate having a circular periphery rotatably mounted on said first plate and tangent to the reference line at said point, a plurality of curves on said second plate each extending inwardly from a common initial point on said circular periphery in accordance with selected mathematical functions, and means movable into and out of engagement with said second plate periphery for measuring the distance through which said common initial point travels during angular rotations of said second plate during one direction of adjustment of a selected curve of said plurality to displace that curve radially from the reference point for successive selected points of a said irregular curve.

7. An integrating device for computing from a first curve the area contained under a second curve having ordinates of predetermined mathematical relationship to those of said first curve, comprising a plate having thereon a first reference line and a second reference line perpendicular to and intersecting said first reference line to provide a reference point, a second plate mounted for rotation on said first plate on an axis which lies on said second reference line, the second plate having a peripheral edge which is tangent to said first reference line at said reference point, said second plate having inscribed thereon a curve having a point of origin at the reference point and extending inwardly of said peripheral edge of said plate in such a manner that the radial distance to said curve from any point on said peripheral edge bears a mathematical relationship to the peripheral distance of said point from the reference point dependent upon said first mathematical relationship, and means movable into and out of engagement with the peripheral edge of said second plate for indicating the sum of the ordinates measured.

References Cited in the file of this patent

UNITED STATES PATENTS

| | | |
|---|---|---|
| 961,836 | Blanchard | June 21, 1910 |
| 1,157,609 | Backstrand et al. | Oct. 19, 1915 |
| 1,376,768 | Hess | May 3, 1921 |
| 1,528,944 | Newell | Mar. 10, 1925 |
| 1,692,326 | Boggs | Nov. 20, 1928 |
| 2,118,773 | Ball | May 24, 1938 |
| 2,142,401 | Luhn | Jan. 3, 1939 |
| 2,392,461 | Clifton et al. | Jan. 8, 1946 |
| 2,426,362 | MacDonald | Aug. 26, 1947 |

FOREIGN PATENTS

| | | |
|---|---|---|
| 23,538 | Germany | Sept. 13, 1883 |
| 103,714 | Great Britain | Feb. 8, 1917 |
| 523,152 | Germany | Apr. 20, 1931 |